United States Patent [19]

Komobuchi

[11] Patent Number: 5,532,743
[45] Date of Patent: Jul. 2, 1996

[54] SOLID-STATE IMAGE PICKUP DEVICE

[75] Inventor: Hiroyoshi Komobuchi, Kyoto, Japan

[73] Assignee: Matsushita Electric Industrial Co., Ltd., Japan

[21] Appl. No.: 344,681

[22] Filed: Nov. 17, 1994

Related U.S. Application Data

[63] Continuation of Ser. No. 871,707, Apr. 21, 1992, abandoned.

[30] Foreign Application Priority Data

May 1, 1991 [JP] Japan .................................. 3-100039

[51] Int. Cl.⁶ .................................................. H04N 5/232
[52] U.S. Cl. ........................................... 348/297; 348/362
[58] Field of Search ..................................... 348/362, 363, 348/364, 294, 297; 359/53, 54, 55; 257/292, 294, 432, 435

[56] References Cited

U.S. PATENT DOCUMENTS

| | | | |
|---|---|---|---|
| 4,345,248 | 8/1982 | Togashi et al. | 340/707 |
| 4,767,192 | 8/1988 | Chang et al. | 350/342 |
| 4,823,191 | 4/1989 | Andoh et al. | 358/213.31 |
| 4,838,652 | 6/1989 | Inaba et al. | 359/54 |
| 4,935,820 | 6/1990 | Patel et al. | 359/54 |
| 5,101,275 | 3/1992 | Wijnen | 348/362 X |
| 5,280,359 | 1/1994 | Mimura et al. | 348/363 X |

FOREIGN PATENT DOCUMENTS

| | | | |
|---|---|---|---|
| 0326467 | 8/1989 | European Pat. Off. | |
| 0376282 | 4/1990 | European Pat. Off. | |
| 60-210080 | 10/1985 | Japan | 358/213.19 |
| 2076481 | 3/1990 | Japan | H04N 5/238 |

*Primary Examiner*—Wendy R. Greening
*Attorney, Agent, or Firm*—Beveridge, DeGrandi, Weilacher & Young

[57] ABSTRACT

An image pickup device capable of controlling the quantity of incident light. The device has a liquid crystal layer with upper and lower transparent electrodes disposed over a photosite. A fixed bias voltage is applied to the upper transparent electrode, while another voltage is applied to the lower transparent layer. The photosite converts incident light into electrons, and then stores a signal charge produced by the conversion of the incident light. A variation in the stored signal charge varies the voltage applied to the lower transparent layer. Thus, the liquid crystal layer modulates the incident light in response to a variation of the signal charge quantity.

29 Claims, 7 Drawing Sheets

| | 701 p-layer |
|---|---|
| | 702 n-layer |
| | 703 1st-Poly Silicon |
| | 704 2nd-Poly Silicon |

705 Liquid Crystal ON by strong incident light

706 Liquid Crystal OFF

SOLID-STATE IMAGE PICKUP DEVICE

This application is a continuation of application Ser. No. 07/871,707, filed Apr. 21, 1992, now abandoned, which application is entirely incorporated herein by reference.

BACKGROUND OF THE INVENTION

1. Field of the Invention

The present invention relates to a solid-state image pickup device.

2. Description of the Related Art

Heretofore there has been a problem that video cameras have used a lens aperture or electronic shutter to control the luminous energy of incident light, whereby it is impossible to control the luminous energy of the incident light in one picture element unit, and when an intense light is present locally in an image pickup plane, brume occurs at the point by the excessive luminous energy or an entire image plane becomes remarkably dark because of excessive backlight correction, that is, excessive luminous energy reduces backlight condition by excessive stopping down of the iris (cf. U.S. Pat. No. 5,047,847). Thus, the luminous energy of incident light must be controlled in each pixel in order to solve the problem. And a technique of controlling the energy in each pixel is known (cf. Japanese Laid-open Patent No. 1988/35081).

However, the prior art has a problem in that a system in which a feedback loop is formed over two or more frames/fields, an external circuit for feedback loop is necessary, and in addition, a time shift of at least one frame occurs unavoidably between the frame/field of detecting the luminous energy of incident light and the frame/field of feedback destination. The prior art cannot deal with a high speed moving luminous body, and needs the external circuit, thereby preventing the miniaturization of video cameras.

Thus, a solid-state image pickup element becomes necessary in which the luminous energy of incident light is corrected in one pixel for miniaturization, and a feedback loop is formed in the same frame/field for a high speed feedback.

The present invention is made to solve such problems of the above prior art solid-state image pickup devices, and it is an object of the invention to provide a solid-state image pickup device which has a luminous energy correcting function for reducing incident light transmission (ratio) in one pixel during the same frame/field even if an intense light occurs locally on any place of an image plane, and makes it possible to improve the MTF(modulation transfer function) by restricting an area of the incident light transmission reduction to a part of the photo-electric transfer area, thereby making the open area of the photo-electric transfer area narrow.

SUMMARY OF THE INVENTION

A solid-state image pickup device of the present invention comprises a photosite (a photo-electric transfer part) disposed in matrix form on a substrate, where incident light is converted into signal charge and stored, for converting incident light to electron and for storing a photo-electrically converted signal charge, and an incident light control layer disposed at a light incident side of the photosite, having such a characteristics that an incident light transmission of the incident light control layer is modulated corresponding to an incident light quantity or an accumulated signal charge quantity.

BRIEF DESCRIPTION OF THE DRAWINGS

FIG. 3 (A) is a graph showing applied voltage-transmissions characteristics of liquid crystal and FIG. 3 (B) is a graph showing photo-electric conversion characteristics of the embodiment.

PREFERRED EMBODIMENTS OF THE PRESENT INVENTION

With reference to drawings, embodiments of the present invention will be described hereinafter.

Figure 1:
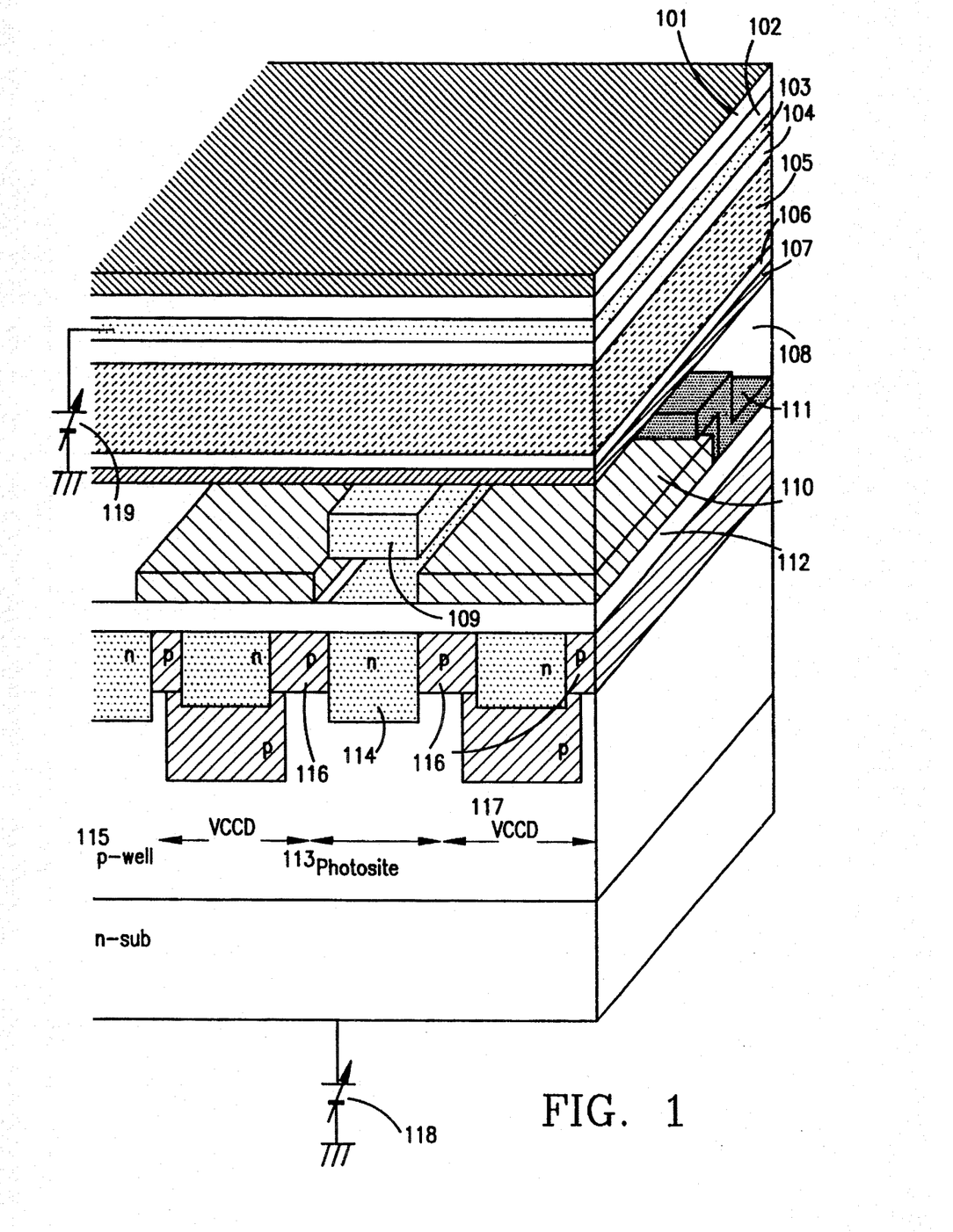
FIG. 1 is a perspective view of a floating electrode type single pixel according to an embodiment of the present invention.

FIG. 1 shows a perspective view of a floating electrode-type single pixel. Incident light is irradiated through a polarizing plate 101, a cover glass 102, a transparent electrode 103, an insulator 104, a liquid crystal 105, an insulator 106, a polarizing plate 107, an insulator 108, and a transparent electrode 109 to a photosite 113 constituted by N layer 114 and p-well 115, and is converted to electrons, and then the signal charge is stored in a depletion layer capacitor formed at a junction part of the N layer 114 and the p-well 115. The photosite is separated from VCCD 117 by a channel stopper 116. A bias 118 is applied to a substrate and a bias 119 is applied to the liquid crystal 105. Poly-Si 110, 111 are employed as electrodes of the VCCD 117.

Figure 2:
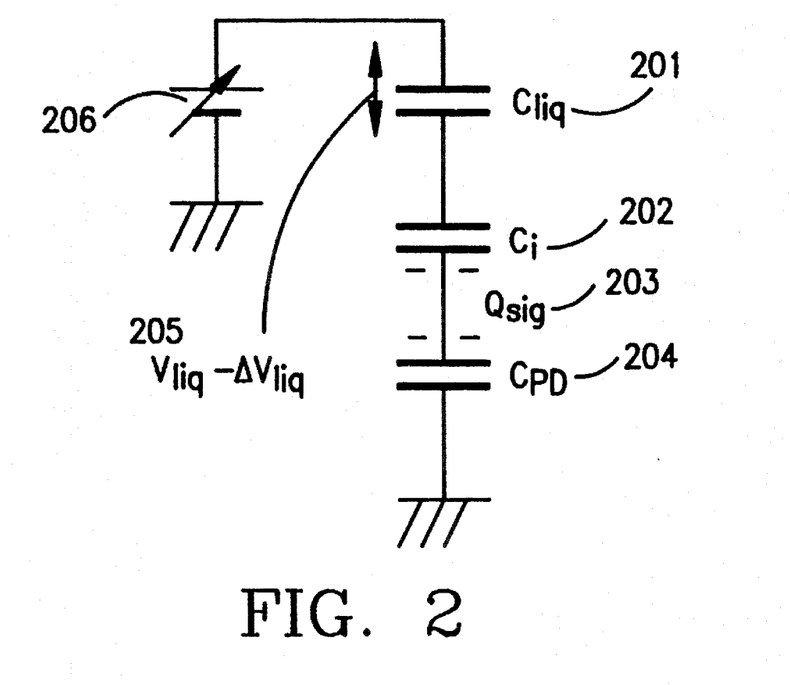
FIG. 2 is an equivalent circuit of the floating electrode type pixel.

The operation of the floating electrode-type single pixel of FIG. 1 is described as follows referring to an equivalent circuit of FIG. 2. In the equivalent circuit, a depletion layer formed at a junction part of the N layer 114 and the p-well 115 corresponds to storing capacitor 204. A signal charge $\Delta Q_{sig}$ generated by the incident light and is stored in the storing capacitor of the depletion layer 204 and the capacitor of the insulator 202 as a signal charge quantity 203. As a result, the voltage $V_{liq}$ applied to the liquid crystal 105 by the bias 119 changes by a variation $\Delta V_{liq}$. Using a liquid crystal capacitance $C_{liq}$ 201, an insulator capacitance $C_i$ 202, and a capacitance of the depletion layer $C_{PD}$ 204, the variation $\Delta V_{liq}$ of the voltage applied to the liquid crystal 105 can be expressed in the following equation (1):

$$\Delta V_{liq} = \frac{\Delta Q_{sig}}{\frac{C_{liq}C_i + C_iC_{PD} + C_{PD}C_{liq}}{C_i}} \quad (1)$$

Figure 3A:
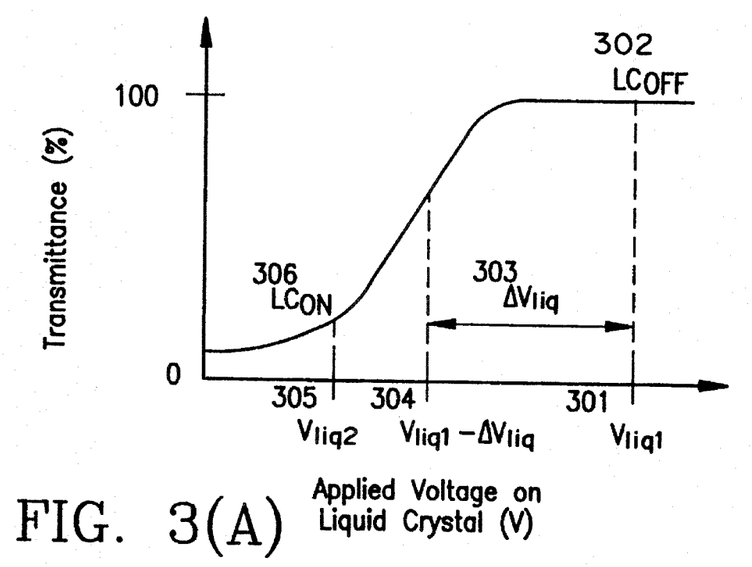

As described above, the voltage $V_{liq}$ applied to the liquid crystal 105 is reduced to $(V_{liq}-\Delta V_{liq})$ 205 by the photo generated signal charge. FIG. 3(A) shows the applied voltage—transmission characteristics of the liquid crystal 105. First, the transmission of the liquid crystal is maximum value $LC_{OFF}$ 302 by the voltage $V_{liql}$ 301 applied to the liquid crystal 105. As described above, the voltage applied to the liquid crystal 105 varies to $(V_{liql}-\Delta V_{liq})$ 304 by the signal charge $Q_{sig}$ generated by incident light. As a result, the transmission of the liquid crystal 105 reduces. And the more the incident light quantity is, the more the applied voltage to the liquid crystal 105 varies and the more the transmission of the liquid crystal 105 reduces until $V_{liq1}\Delta V_{liq}=V_{liq2}$. The blocking state corresponds to $LC_{ON}$ 306 when $V_{liq2}$ is applied to liquid crystal 105.

Figure 3B:
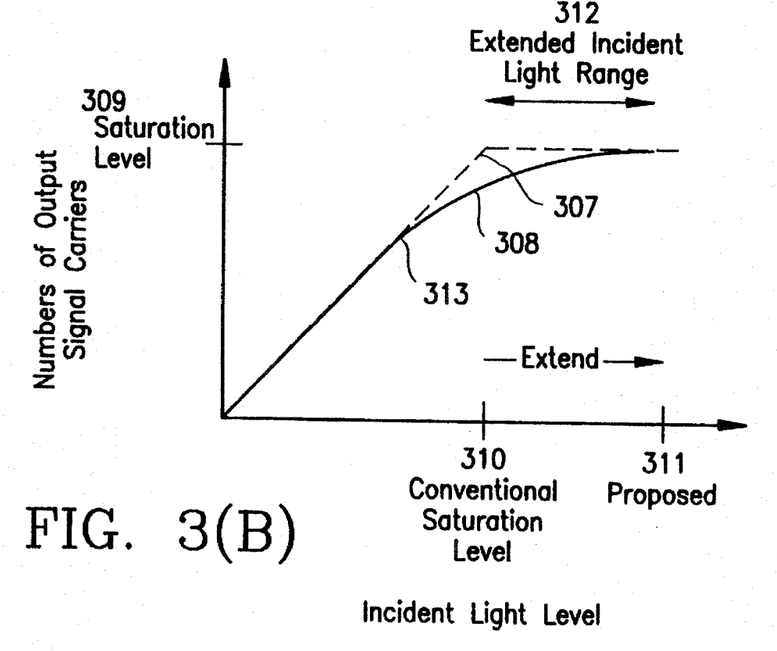

FIG. 3(B) shows the photo-electric conversion characteristics of the invented pixel having the transmission characteristics of FIG. 3(A). The line 308 shows the invented pixel and the broken line 307 shows a conventional pixel. Both photo-electric characteristics have the same saturation level. However in the present invention, the more the incident light quantity increases, and the more the signal charge $\Delta Q_{sig}$ increases, the more the voltage applied to the liquid crystal 105 reduces as shown in the equation (1), and the light transmission reduces as shown in FIG. 3(A). As a result, with the solid line 308 of the photo-electric conversion characteristics, the saturation level 311 of the present invention pixel is expanded to a high illumination side by an expanded incident light range 312 against the saturation level of the prior pixel. Shifting a knee point (bent point) 313 of the photo-electric conversion characteristics line 308 to a low illumination side is realized by making the liquid crystal capacitance $C_{liq}$ 201 and the charging capacitance $C_{PD}$ 204 small, and/or making the insulator capacitance $C_i$ 202 large, because the shifting is realized by making the voltage $\Delta V_{liq}$ modulated by the stored signal charge large in the equation (1).

Figure 4:
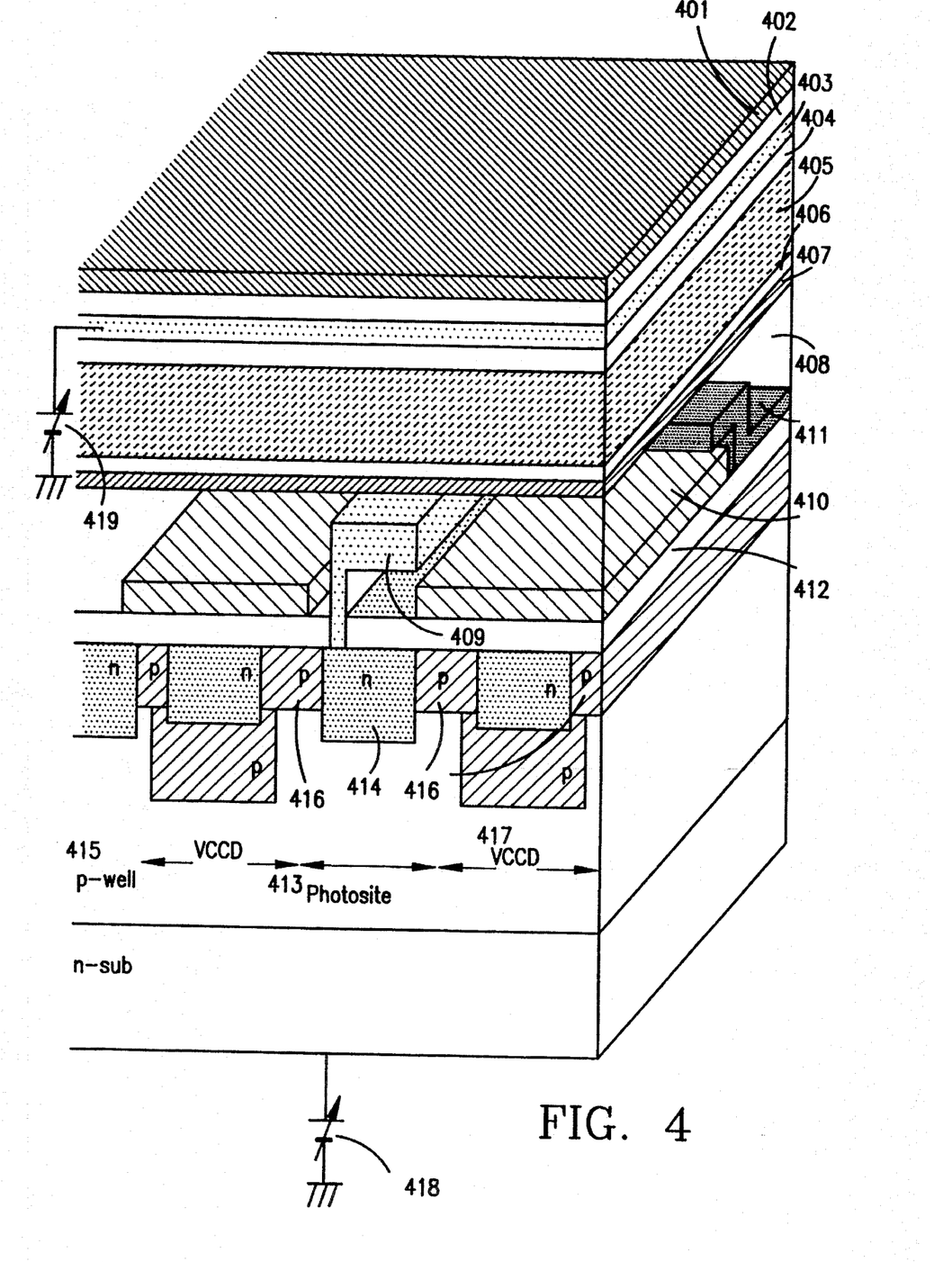
FIG. 4 is a perspective view of a diffusion electrode-type one pixel according to an embodiment of the present invention.

FIG. 4 show a perspective view of a diffusion electrode-type single pixel element. Incident light is irradiated through a polarizing plate 401, a cover glass 402, a transparent electrode 403, an insulator 404, a liquid crystal 405, an insulator 406, a polarizing plate 407, an insulator 408, and a transparent electrode 409 to a photosite constituted by N layer 414 and p-well 415, and is converted to electrons,and then the signal electrons are stored in a capacitor of a depletion layer formed in a junction part of the N layer 414 and the p-well 415. A bias 418 is applied to the substrate and a bias 419 is applied to the liquid crystal 405. Poly-Si 410, 411 are employed as conversion electrode forming the VCCD 117. A transparent electrode 409 is connected to N layer 414.

Figure 5:
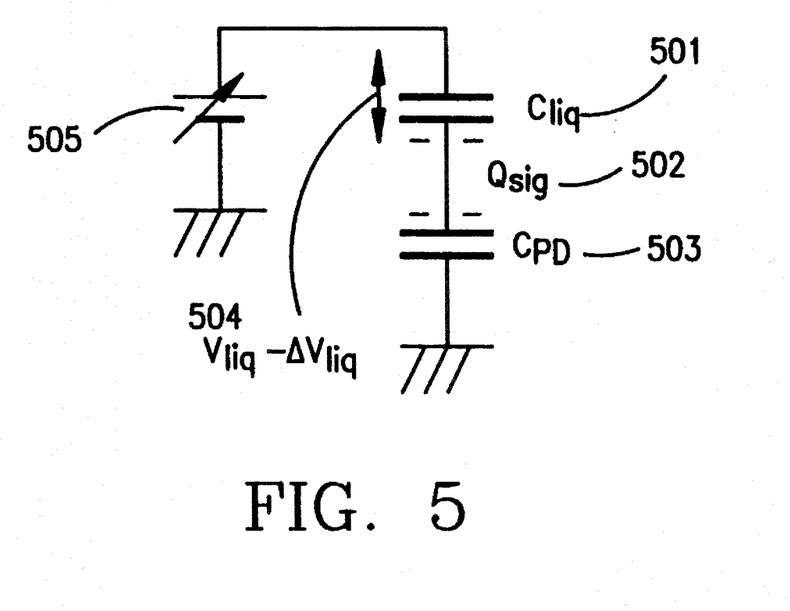
FIG. 5 is an equivalent circuit of the diffusion electrode-type single pixel.

FIG. 5 shows an equivalent circuit to this diffusion electrode-type single pixel. The capacitor in the depletion layer formed at the junction part of the N layer 414 and the p-well 415 for accumulating the signal charge, as described above, corresponds to a photosite capacitor 503. The signal charge $Q_{sig}$ generated from the incident light, and is stored at the storing capacitor 503 and the liquid crystal capacitor 501 as signal charge quantity 502. As a result, the voltage $V_{liq}$ applied to the liquid crystal 405 by the bias 419 varies by $\Delta V_{liq}$.

The variation $\Delta V_{liq}$ of the voltage applied to the liquid crystal 405 can be expressed in the following equation (2) by using a liquid capacitance $C_{liq}$ 501 and an storing capacitance $C_{PD}$ 503.

$$\Delta V_{liq} = \frac{\Delta Q_{sig}}{C_{PD} + C_{liq}} \quad (2)$$

In this embodiment, the upper limit of the incident light range is expanded to the high illuminated side against the prior CCD, as described in the photo-electric conversion characteristics line 308. And since the transparent electrode 409 is connected to N layer 414, more dynamic voltage modulation can be obtained. In this embodiment, shifting a knee point (bent point) 313 of the photo-electric conversion characteristics line 308 to a low illumination side is realized by making the liquid crystal capacitance $C_{liq}$ 501 and the photodiode capacitance $C_{PD}$ 503 small, because the shifting is realized by making the voltage $\Delta V_{liq}$ modulated by the stored signal charge large in the equation (2).

Figures 6A, 6B:
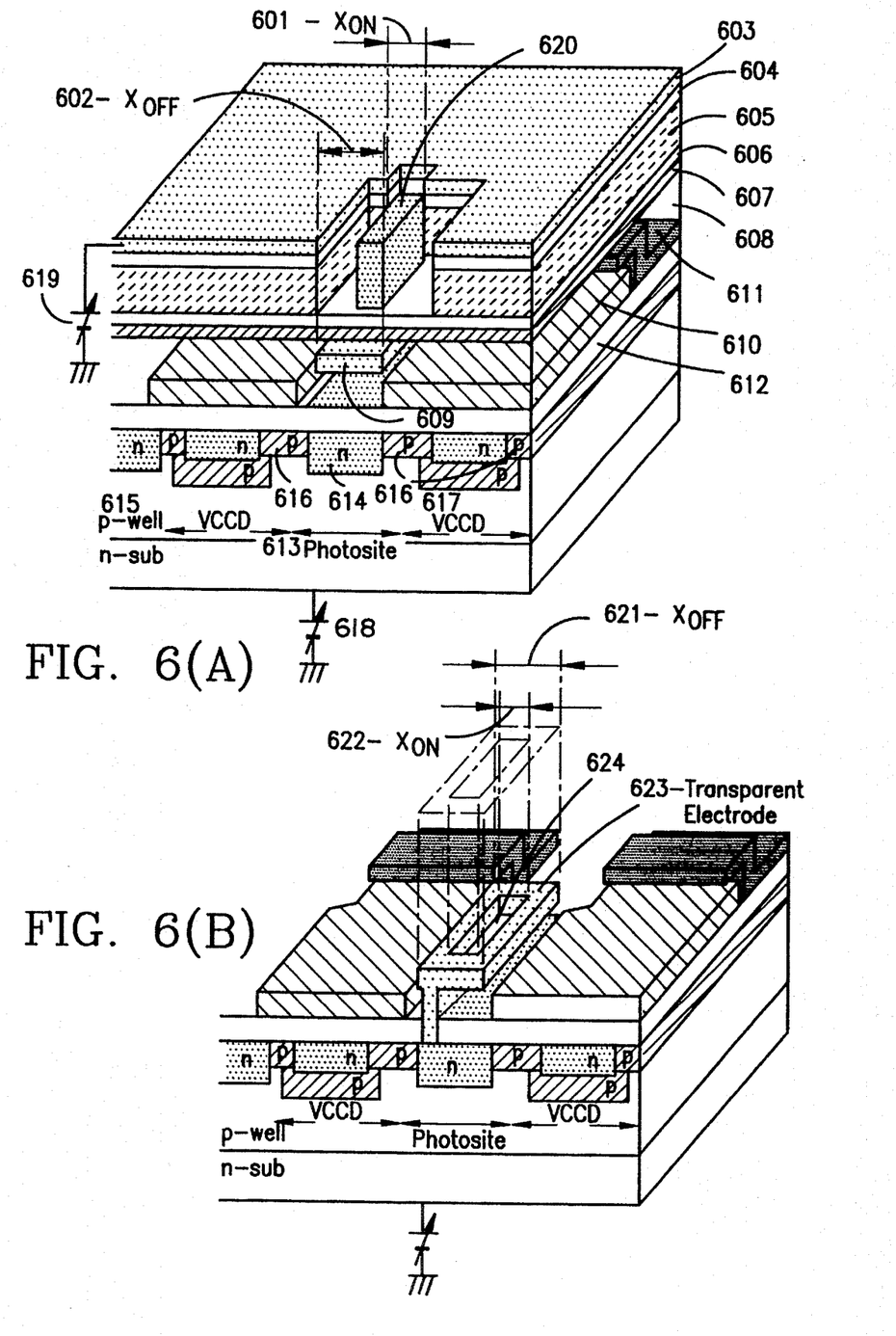
FIG. 6(A) is a perspective view of the structure of the pixel having an aperture formed by using transparent resin.
FIG. 6(B) is a perspective view of the structure of the pixel having a lower electrode aperture of an embodiment.

FIG. 6(A) shows a perspective view of the structure of a floating gate type improving MTF. Since the outside appearance of the structure is the same as that of FIG. 1, FIG. 6(A) shows such structure that the polarizing plate 101 and the cover glass 102 are removed from the structure of FIG. 1. Now 603 is a transparent electrode, 604 is an insulator, 605 is a liquid crystal, 606 is an insulator 607 is a polarizing plate, 608 is an insulator, 609 is a transparent electrode, 614 is N layer, 615 is a p-well, 617 is VCCD, and 616 is a channel stopper. 618 is a bias and 619 is a bias and 610 and 611 are Poly-Si electrodes.

A $SiO_2$ or a transparent resin 620 is formed boring through the liquid crystal 605. The width of the transparent resin 620 is X-on 601 and the width of the photo-electric conversion area is X-off 602 which is smaller than the X-on 601. The FIG. 6(A) shows such structure view in which the transparent electrode 603, the insulator 604 and the liquid crystal around the transparent resin 620 are removed for illustration convenience. When the incident light quantity is large, the light transmission decreases and the aperture for the N layer 614 varies from X-off 602 to X-on 601. Using a picture element pitch p and one side X of the aperture, the MTF of the element can be expressed in the following equation (3):

$$MTF(X) = \frac{\sin(2/\pi \cdot X/p)}{2/\pi \cdot X/p} \quad (3)$$

Accordingly, in the above case, $(MTF(X=X_{on}))>(MTF(X=X_{oFF}))$ is obtained, which means that where there is a large amount of the luminous energy of incident light, the MTF can be improved.

FIG. 6(B) shows a perspective view of the structure of a diffusion electrode type with an improved MTF. Since the outside appearance of the structure is same as that of FIG. 4, FIG. 6(B) shows such structure that the polarizing plate 401, the cover glass 402, the transparent electrode 403, the insulator 404, the liquid crystal 405, the insulator 406, the polarizing plate 407 and the insulator 408 are removed from the structure of FIG. 4. Now 623 is a lower transparent electrode, and 624 is an aperture of the lower transparent electrode 623, and X- off 621 is the width of the aperture 624 and the X-on 622 is the width of the photo-electric conversion area (the lower transparent electrode 623). The structure of FIG. 6 (B) can improve MTF without using the transparent resin 620 of FIG. 6 (A), by using the lower transparent electrode 623 having the aperture 624.

In the structure of FIG. 6(B), the part of the liquid crystal above the aperture 624 is not effected by the modulation voltage of the signal charge $\Delta Q_{sig}$, and the liquid crystal part becomes a state of $LC_{OFF}$ 302 and thereby the light transmission above the aperture 624 becomes constant irrespectively of the incident light quantity. The liquid crystal part between the transparent electrode 623 and the transparent electrode 103 is supplied with the modulation voltage of the signal charge $\Delta Q_{sig}$ as shown by the equation (1). As a result, as indicated with solid line 308 of the photo-electric conversion characteristics, the saturation level 311 of the present invention pixel is expanded to a high illumination side by an expanded incident light range 312 against the saturation level of the prior pixel.

Figure 7:
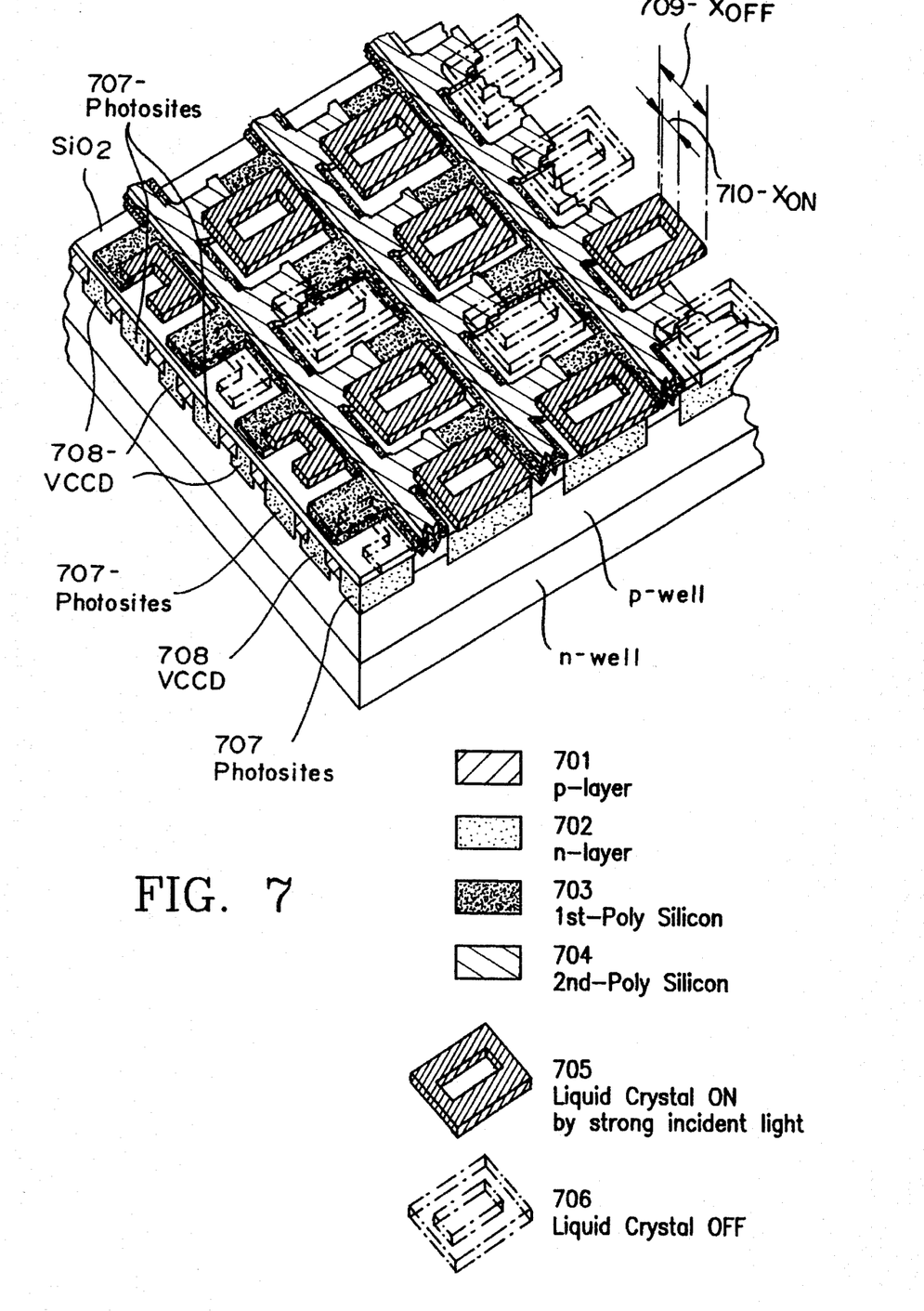
FIG. 7 is a perspective view of the structure of the solid-state image pickup device in an embodiment of the present invention.

FIG. 7 is an embodiment of the solid-state image pickup device applied with the structure of the element unit of FIG. 6(A), FIG. 6(B). 701 indicates a p-layer, 702 indicates a n-layer, 703 indicates 1st-Poly Silicon and 704 indicates 2nd-Poly Silicon. 705 (real line hatching) shows a light shut state $LC_{ON}$ of the liquid crystal ON by strong incident light and 706 (chain line) shows a light transparent state $LC_{OFF}$ of the liquid crystal OFF by non-strong incident light.

Thus the liquid crystal ON realizes reduction of light transmission, and thereby the intensity level of the incident light can be fed back in same frame/field period and the element unit can be controlled individually.

Figure 6C:
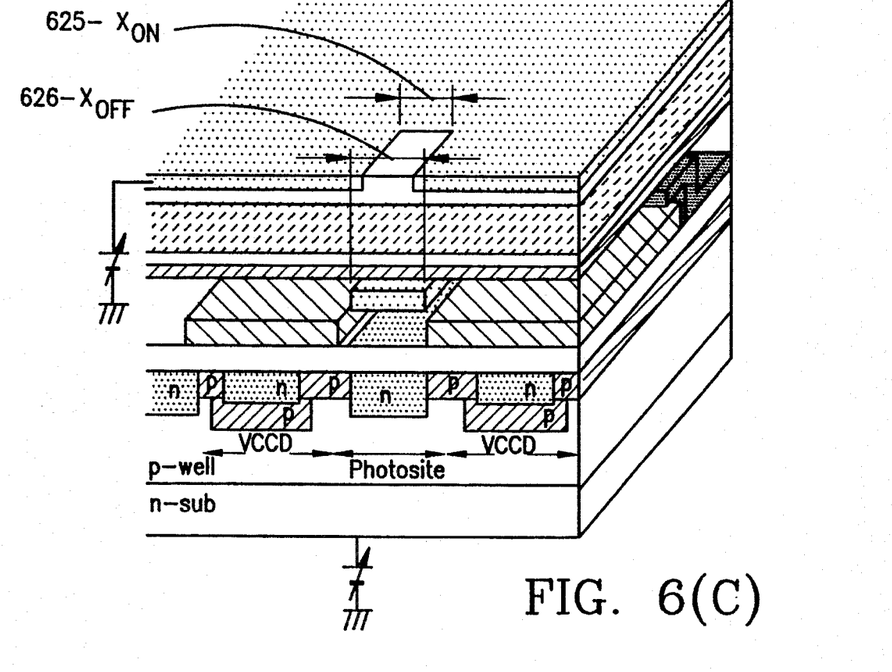
FIG. 6(C) is a perspective view of the structure of the pixel having an upper electrode aperture of an embodiment of the floating electrode type.

And as shown in FIG. 6(C), the upper transparent electrode 103 can be partly removed, thereby forming an aperture and the MTF can be improved.

Meanwhile as a material for controlling the light transmission, electrochronism and so on which have voltage-light transmission characteristics as shown in FIG. 3(A) can be used.

Figure 6D:
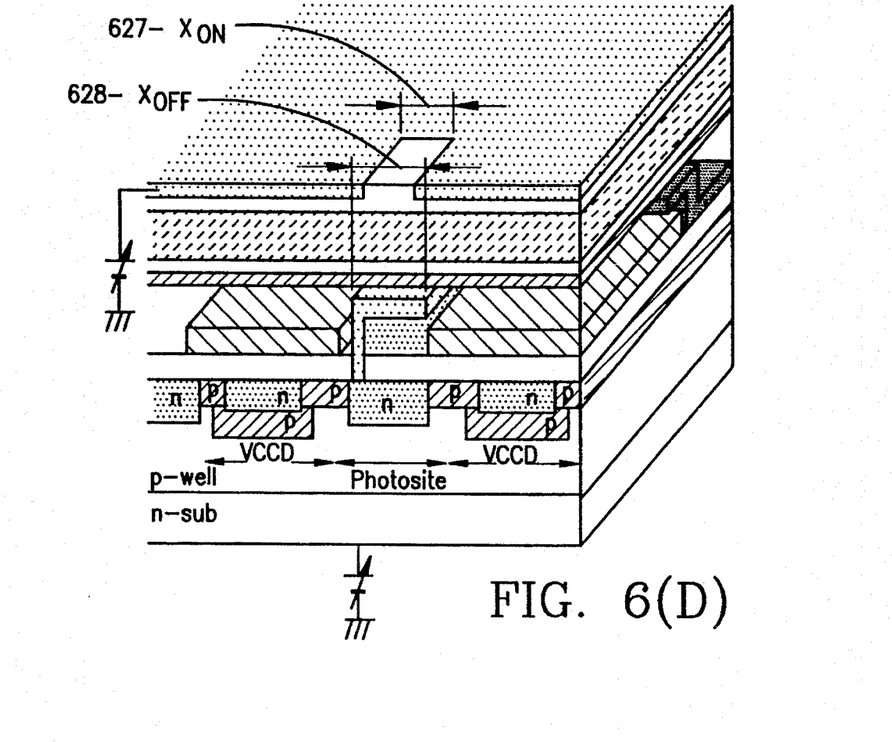
FIG. 6(D) is a perspective view of the structure of the pixel having an upper electrode aperture of an embodiment of the diffusion electrode type.

And further as shown in FIG. 6(D), the upper transparent electrode 103 can be partly removed in the embodiment of the diffusion electrode type, thereby forming an aperture and the MTF can be improved.

Further MTF can be improved by partly restricting the liquid crystal 105 by using other methods than the above mentioned use of the transparent resin $(SiO_2)$620. For example, glass material can be used.

The aperture or transparent resin can be disposed anywhere within the area of the photo-electric conversion area to improve MTF.

As described above, in the present invention, by using a material for controlling light transmission, the luminous energy of the incident light can be corrected on a chip during the same frame/field in element unit, whereby the upper limit of the range of the luminous energy of the incident light may be expanded to a higher illumination side. Then the wide dynamic range can be obtained.

Also, an aperture window narrower in area than that of the photo-electric conversion part is provided, thereby allowing an element in which the MTF is improved when there is a large amount of the luminous energy of incident light.

What is claimed is:

1. A solid-state image pickup device comprising:

a photosite disposed on a substrate, for converting incident light to electrons and for storing a photo-electrically converted signal charge produced by said electrons, and an incident light control layer disposed over a light incident side of said photosite, for modulating light transmitted through said incident light control layer in response to variation in quantity of a stored signal charge produced by variation in quantity of incident light received by said photosite, and a first transparent electrode located on a light incident Side of said incident light control layer and electrically connected to said photosite through said incident light control layer.

2. A solid-state image pickup device in accordance with claim 1, wherein said light transmitted through said incident light control layer is modulated in response to variation in voltage applied across said incident light control layer by said first transparent electrode, such variation in voltage applied across said incident light control layer being produced by variation in a stored signal charge.

3. A solid-state image pickup device in accordance with claim 1, further including a second transparent electrode disposed at a photosite side of said incident light control layer, light transmitted through said incident light control layer being modulated in response to variation in a voltage applied to said second transparent electrode, said second transparent electrode being in a floating condition such that a voltage applied to said second transparent electrode varies in response to variation in quantity of a signal charge stored at said photosite.

4. A solid-state image pickup device in accordance with claim 3, wherein said second transparent electrode is conductively connected to said photosite.

5. A solid-state image pickup device in accordance with claim 1, wherein said incident light control layer includes an area of constant transmittance through which light is transmitted to said photosite, said area of constant transmittance being narrower than an area of said photosite.

6. A solid-state image pickup device in accordance with claim 1, wherein said first transparent electrode has an aperture section narrower than said photosite.

7. A solid-state image pickup device in accordance with claim 3, wherein said second transparent electrode has an aperture section narrower than said photosite.

8. A solid-state image pickup device in accordance with claim 5, wherein said area of constant transmittance is formed by a transparent member, passing through said incident light control layer.

9. A solid-state image pickup device, comprising:

a photosite disposed on a substrate, for converting incident light to electrons and for storing a photo-electrically converted signal charge produced by said electrons, and an incident light control layer disposed over a light incident side of said photosite, for modulating light transmitted through said incident light control layer, such that variation in quantity of a photo-electrically converted signal charge produced by variation of incident light received by said photosite is applied directly to said incident light control layer through layers of material interposed between said incident light control layer and said photosite to operate said incident light control layer, thereby controlling incident light received by said photosite to vary a quantity of said photo-electrically converted signal charge.

10. A solid-state image pickup device comprising:

a plurality of photosites, disposed on a substrate in a matrix arrangement, for converting incident light to electrons and for storing a photo-electrically converted signal charge produced by said electrons, and a plurality of incident light control layer areas, each of said incident light control layer areas being disposed over a light incident side of at least one of said plurality of photosites, for modulating light transmitted therethrough in response to variation in quantity of a stored signal charge quantity produced by variation in an amount of light incident on said photosite, wherein at least one of said incident light control layer areas has a first transparent electrode disposed at a light incident side of said incident light control layer area and a second transparent electrode disposed at a photosite side of said incident light control layer area, said first transparent electrode is supplied with a bias first voltage and has an aperture section narrower than an aperture section of said photosite, light transmitted through said at least one incident light control layer area is modulated in response to variation in a second voltage applied to said second transparent electrode, and said second transparent electrode is in a floating condition such that a second voltage applied to said second transparent electrode varies in response to variation in quantity of a stored signal charge produced by variation in quantity of light transmitted through said at least one incident light control layer area.

11. A solid-state image pickup device comprising:

a plurality of photosites, disposed on a substrate in a matrix arrangement, for converting incident light to electrons and for storing a photo-electrically converted signal charge produced by said electrons, and a plurality of incident light control layer areas, each of said incident light control areas being disposed over a light incident side of at least one of said plurality of photosites, for modulating light transmitted therethrough in response to variation in quantity of a stored signal charge produced by variation in an amount of light incident on said photosite, wherein at least one of said incident light control layer areas has a first transparent electrode disposed at a light incident side of said at least one incident light control layer area and a second transparent electrode disposed at a photosite side of said at least one incident light control layer area, said first transparent electrode is supplied with a bias first voltage, light transmitted through said at least one incident light control layer area is modulated in response to variation in a second voltage applied to said second transparent electrode, said second transparent electrode has an aperture section narrower than an aperture section of said photosite and is in a floating condition such that a second voltage applied to said second transparent electrode varies in response to variation of a quantity of a stored signal charge produced by variation of a quantity of light transmitted through said at least one incident light control layer area.

12. A solid-state image pickup device comprising:

a plurality of photosites, disposed on a substrate in a matrix arrangement, for converting incident light to electrons and for storing a photo-electrically converted signal charge produced by said electrons, a plurality of incident light control layer areas, each of said incident light control layer areas being disposed over a light incident side of at least one of said plurality of photosites, for modulating light transmitted therethrough in response to variation in quantity of a stored signal charge produced by variation in an amount of said light incident on each said photosite, wherein at least one of said incident light control layer areas has a transparent member which passes therethrough and which is disposed above said photosite, so as to form a permanent window in said incident light control layer.

13. A solid-state image pickup device comprising:

a plurality of photosites, disposed on a substrate in a matrix arrangement, for converting incident light to electrons and for storing a photo-electrically converted signal charge produced by said electrons, and plurality of incident light control layer areas, each of said incident light control layer areas being disposed over a light incident side of at least one of said plurality of photosites, for modulating light transmitted therethrough in response to variation in quantity of a stored signal charge produced by variation in an amount of light incident on said photosite, at least one of said it incident light control layer areas having a first transparent electrode disposed at a light incident side of said incident light control layer area and a second transparent electrode disposed at a photosite side of said incident light control layer area, wherein said first transparent electrode is supplied with a bias first voltage and has an aperture section narrower than a section of said photosite, light transmitted through said at least one incident light control layer area is modulated by a second voltage applied to said second transparent electrode, and said second transparent electrode is connected to a depletion impurity diffusion part of said photosite.

14. A solid-state image pickup device comprising:

a plurality of photosites, disposed on a substrate in a matrix arrangement, for converting incident light to electrons and for storing a photo-electrically converted signal charge produced by said electrons, and a plurality of incident light control layer areas, each of said incident light control layer areas being disposed over a light incident side of at least one of said plurality of photosites, for modulating light transmitted therethrough in response to variation in quantity of a stored signal charge produced by variation in an amount of light incident on said photosite, at least one of said incident light control layer areas having a first transparent electrode disposed at a light incident side of said at least one incident light control layer area and a second transparent electrode disposed at a photosite side of said at least one incident light control layer area, wherein said first transparent electrode is supplied with a bias first voltage, light transmitted through said at least one incident light control layer area is modulated by a second voltage applied to said second transparent electrode, and said second transparent electrode has an aperture section narrower than a section of said photosite.

15. A solid-state image pickup device in accordance with claim 9, wherein said incident light control layer has a first transparent electrode disposed at a light incident side of said incident light control layer and a second transparent electrode disposed at a photosite side of said incident light control layer, said first transparent electrode is supplied with a bias first voltage, and light transmitted through said incident light control layer is modulated in response to variation in a second voltage applied to said second transparent electrode, said second transparent electrode being in a floating condition such that a second voltage applied to said second transparent electrode varies in response to variation in quantity of a stored signal charge produced by variation in quantity of light transmitted through said incident light control layer.

16. A solid-state image pickup device in accordance with claim 9, wherein said incident light control layer has a first transparent electrode disposed at a light incident side of said incident light control layer and a second transparent electrode disposed at a photosite side of said incident light control layer, said first transparent electrode is supplied with a bias first voltage, and light transmitted through said incident light control layer is modulated by a second voltage applied to said second transparent electrode, said second transparent electrode being conductively or capacitively connected to said photosite.

17. A solid-state image pickup device in accordance with claim 9, wherein said incident light control layer includes an area of constant transmittance through which light is transmitted to a photosite said area of said incident light control layer being narrower than an area of said photosite.

18. A solid-state image pickup device in accordance with claim 15, wherein said first transparent electrode has an aperture section narrower than said photosite.

19. A solid-state image pickup device in accordance with claim 15, wherein said second transparent electrode has an aperture section narrower than said photosite.

20. A solid-state image pickup device in accordance with claim 9, wherein said incident light control layer is disposed above a partial section of said photosite.

21. A solid-state image pickup device in accordance with claim 20, wherein a transparent member, passing through said incident light control layer, is disposed above another partial section of said photosite.

22. A solid-state image pickup device in accordance with claim 16, wherein said first transparent electrode has an aperture section narrower than a section of said photosite.

23. A solid-state image pickup device in accordance with claim 16, wherein said second transparent electrode has an aperture section narrower than a section of said photosite.

24. A solid-state image pickup device in accordance with claim 2, wherein a bias voltage is applied to said first transparent electrode to produce a voltage across said incident light control layer, and variation in a stored signal charge varies such voltage across said incident control layer.

25. A solid-state image pickup device in accordance with claim 3, wherein said second transparent electrode is capacitively connected to said photosite.

26. A solid-state image pickup device in accordance with claim 1, wherein said incident light control layer modulates light during a single frame/field period of operation of said pickup device in response to variation in quantity of a stored signal charge during said same frame/field period.

27. A solid-state image pickup device in accordance with claim 9, wherein said incident light control layer modulates light during a single frame/field period of operation of said pickup device in response to variation in quantity of a stored signal charge during said same frame/field period.

28. A solid-state image pickup device in accordance with claim 1, wherein said first transparent electrode is capacitively connected to said photosite.

29. A solid-state image pickup device in accordance with claim 1, wherein said first transparent electrode is conductively connected to said photosite.

* * * * *